United States Patent
Jones-McFadden et al.

(10) Patent No.: US 10,726,434 B2
(45) Date of Patent: Jul. 28, 2020

(54) LEVERAGING AN ARTIFICIAL INTELLIGENCE ENGINE TO GENERATE CUSTOMER-SPECIFIC USER EXPERIENCES BASED ON REAL-TIME ANALYSIS OF CUSTOMER RESPONSES TO RECOMMENDATIONS

(71) Applicant: BANK OF AMERICA CORPORATION, Charlotte, NC (US)

(72) Inventors: Alicia C. Jones-McFadden, Fort Mill, SC (US); Matthew Hsieh, Charlotte, NC (US); Scott R. Enscoe, Charlotte, NC (US); Raghav Anand, Chadds Ford, PA (US); Michael Anderson, Colleyville, TX (US); Elizabeth Ann Miller, Brooklyn, NY (US); Daniel Shilov, Nashua, NH (US); Alicia Anli Salvino, Rockville, MD (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/656,204

(22) Filed: Oct. 17, 2019

(65) Prior Publication Data
US 2020/0051100 A1    Feb. 13, 2020

Related U.S. Application Data

(62) Division of application No. 15/288,565, filed on Oct. 7, 2016, now Pat. No. 10,510,088.

(51) Int. Cl.
*G06Q 30/02* (2012.01)
*G06N 20/00* (2019.01)
*G06F 3/0481* (2013.01)

(52) U.S. Cl.
CPC ....... *G06Q 30/0203* (2013.01); *G06F 3/0481* (2013.01); *G06N 20/00* (2019.01); *G06Q 30/0204* (2013.01)

(58) Field of Classification Search
CPC ......... G06Q 10/00; G06Q 40/00; G06Q 40/06
(Continued)

(56) References Cited

U.S. PATENT DOCUMENTS

| | | |
|---|---|---|
| 5,864,684 A | 1/1999 | Nielsen |
| 5,918,217 A | 6/1999 | Maggioncalda et al. |

(Continued)

FOREIGN PATENT DOCUMENTS

| | | |
|---|---|---|
| CA | 2626172 A1 | 11/2009 |
| CA | 2629653 A1 | 11/2009 |

(Continued)

*Primary Examiner* — Romain Jeanty
(74) *Attorney, Agent, or Firm* — Michael A. Springs; Moore & Van Allen PLLC; James C. Edwards

(57) ABSTRACT

Embodiments leverage an artificial intelligence engine to generate customer-specific user experiences based on real-time analysis of customer responses to recommend and/or experienced features. Some embodiments access a profile of an end user comprising at least one first characteristic associated with the end user and extract end user information from a database of an entity server; identify a first trend related to resource utilization and/or management implemented by the end user based on the extracted end user information; determine an opportunity based on the identified first trend; in response to determining the opportunity, transmit control signals configured to cause the graphical user interface of the device of the end user to display graphically at least one recommendation based on the determined opportunity to the end user; and receive an input selecting or declining at least one recommendation. These inputs may correlate to a modified interface experience.

5 Claims, 9 Drawing Sheets

(58) Field of Classification Search
USPC .................................................. 705/7.32
See application file for complete search history.

(56) References Cited

U.S. PATENT DOCUMENTS

| | | | |
|---|---|---|---|
| 6,012,044 A | 1/2000 | Maggioncalda et al. | |
| 6,278,993 B1 | 8/2001 | Kumar et al. | |
| 6,327,578 B1 | 12/2001 | Linehan | |
| 6,629,081 B1 | 9/2003 | Cornelius et al. | |
| 6,633,910 B1 | 10/2003 | Rajan et al. | |
| 6,782,374 B2 | 8/2004 | Nichols | |
| 6,829,334 B1 | 12/2004 | Zirngibl et al. | |
| 6,892,192 B1 | 5/2005 | Geddes et al. | |
| 7,085,834 B2 | 8/2006 | Delany et al. | |
| 7,092,992 B1 | 8/2006 | Yu | |
| 7,103,556 B2 | 9/2006 | Del Rey et al. | |
| 7,149,704 B2 * | 12/2006 | Martin | G06Q 30/02 705/7.32 |
| 7,165,041 B1 | 1/2007 | Guheen et al. | |
| 7,296,734 B2 | 11/2007 | Pliha | |
| 7,363,339 B2 | 4/2008 | Delany et al. | |
| 7,364,071 B2 | 4/2008 | Esplin et al. | |
| 7,406,537 B2 | 7/2008 | Cullen | |
| 7,412,534 B2 | 8/2008 | Tsang et al. | |
| 7,444,304 B2 | 10/2008 | Mellinger et al. | |
| 7,486,780 B2 | 2/2009 | Zirngibl et al. | |
| 7,624,073 B1 | 11/2009 | Robinson et al. | |
| 7,672,879 B1 | 3/2010 | Kumar et al. | |
| 7,698,190 B2 | 4/2010 | Penkalski et al. | |
| 7,774,257 B2 | 8/2010 | Maggioncalda et al. | |
| 7,788,147 B2 | 8/2010 | Haggerty et al. | |
| 7,797,267 B2 | 9/2010 | Horvitz | |
| 7,813,989 B2 | 10/2010 | Jones et al. | |
| 7,860,774 B1 | 12/2010 | Peterson et al. | |
| 7,912,770 B2 | 3/2011 | Haggerty et al. | |
| 8,060,423 B1 | 11/2011 | Rukonic et al. | |
| 8,073,759 B1 | 12/2011 | Del Favero et al. | |
| 8,122,123 B2 | 2/2012 | Bhattacharya et al. | |
| 8,135,655 B2 | 3/2012 | Oaten et al. | |
| 8,260,699 B2 | 9/2012 | Smith et al. | |
| 8,306,894 B2 | 11/2012 | Newman et al. | |
| 8,346,568 B1 | 1/2013 | Del Favero et al. | |
| 8,396,791 B2 | 3/2013 | Cotton | |
| 8,407,137 B2 | 3/2013 | Thomas | |
| 8,429,038 B1 | 4/2013 | Harman et al. | |
| 8,458,051 B1 | 6/2013 | Saltzman et al. | |
| 8,473,380 B2 | 6/2013 | Thomas et al. | |
| 8,494,936 B2 | 7/2013 | Brenner | |
| 8,515,828 B1 | 8/2013 | Wolf et al. | |
| 8,548,929 B1 * | 10/2013 | Goodwin | G06Q 10/06 705/321 |
| 8,594,283 B2 | 11/2013 | Hogan et al. | |
| 8,639,567 B2 | 1/2014 | Winters | |
| 8,639,638 B2 | 1/2014 | Shae et al. | |
| 8,682,793 B2 | 3/2014 | Carlson et al. | |
| 8,688,699 B2 * | 4/2014 | Eggink | G06Q 10/10 707/732 |
| 8,713,090 B2 | 4/2014 | Sadovsky et al. | |
| 8,719,132 B1 | 5/2014 | Diggdon et al. | |
| 8,732,073 B2 | 5/2014 | Thomas | |
| 8,768,736 B1 | 7/2014 | Chapman et al. | |
| 8,768,800 B2 | 7/2014 | Milosavljevic et al. | |
| 8,768,833 B2 | 7/2014 | Freishtat et al. | |
| 8,788,661 B2 | 7/2014 | Raleigh | |
| 8,825,759 B1 | 9/2014 | Jackson et al. | |
| 8,930,217 B2 | 1/2015 | Feinschreiber et al. | |
| 8,935,342 B2 | 1/2015 | Patel | |
| 9,098,387 B1 | 8/2015 | Curtis et al. | |
| 9,256,876 B2 | 2/2016 | Vasant Akole et al. | |
| 9,286,637 B1 | 3/2016 | Keld et al. | |
| 9,411,942 B2 | 8/2016 | Commons et al. | |
| 9,460,443 B1 | 10/2016 | Curtis et al. | |
| 9,596,317 B2 * | 3/2017 | Daley | H04L 67/22 |
| 10,198,776 B2 * | 2/2019 | Roiniotis | G06Q 50/01 |
| 2002/0174185 A1 | 11/2002 | Rawat et al. | |
| 2002/0180786 A1 | 12/2002 | Tanner | |
| 2003/0120593 A1 | 6/2003 | Bansal et al. | |
| 2003/0139986 A1 | 7/2003 | Roberts | |
| 2003/0206554 A1 | 11/2003 | Dillon | |
| 2004/0107125 A1 | 6/2004 | Guheen et al. | |
| 2004/0138959 A1 | 7/2004 | Hlavac et al. | |
| 2004/0153413 A1 | 8/2004 | Gross | |
| 2004/0162773 A1 | 8/2004 | Del Rey et al. | |
| 2004/0175680 A1 | 9/2004 | Hlavac et al. | |
| 2004/0181591 A1 | 9/2004 | Yu et al. | |
| 2004/0189702 A1 | 9/2004 | Hlavac et al. | |
| 2005/0187862 A1 | 8/2005 | Dheer et al. | |
| 2006/0014535 A1 | 1/2006 | Walker et al. | |
| 2006/0224046 A1 | 10/2006 | Ramadas et al. | |
| 2006/0265201 A1 | 11/2006 | Martin | |
| 2006/0288023 A1 | 12/2006 | Szabo | |
| 2007/0021200 A1 | 1/2007 | Fox et al. | |
| 2007/0112906 A1 | 5/2007 | Liu et al. | |
| 2007/0167689 A1 | 7/2007 | Ramadas et al. | |
| 2007/0174448 A1 | 7/2007 | Ahuja et al. | |
| 2007/0286099 A1 | 12/2007 | Stocklein et al. | |
| 2008/0014908 A1 | 1/2008 | Vasant | |
| 2008/0034045 A1 | 2/2008 | Bardsley | |
| 2008/0086409 A1 | 4/2008 | Moorman et al. | |
| 2008/0114677 A1 | 5/2008 | Keohane et al. | |
| 2008/0133734 A1 | 6/2008 | Jacobs et al. | |
| 2009/0024984 A1 | 1/2009 | Maeda | |
| 2009/0106171 A1 | 4/2009 | Hlavac et al. | |
| 2009/0124349 A1 | 5/2009 | Dawson et al. | |
| 2009/0132395 A1 | 5/2009 | Lam et al. | |
| 2009/0276288 A1 | 11/2009 | Hlavac et al. | |
| 2010/0017619 A1 | 1/2010 | Errico | |
| 2010/0100470 A1 | 4/2010 | Buchanan et al. | |
| 2010/0121808 A1 | 5/2010 | Kuhn | |
| 2010/0257066 A1 | 10/2010 | Jones et al. | |
| 2010/0299252 A1 | 11/2010 | Thomas | |
| 2010/0306080 A1 | 12/2010 | Trandal et al. | |
| 2010/0325047 A1 | 12/2010 | Carlson et al. | |
| 2010/0332373 A1 | 12/2010 | Crabtree et al. | |
| 2010/0332583 A1 | 12/2010 | Szabo | |
| 2011/0066505 A1 | 3/2011 | Hammad | |
| 2011/0106775 A1 | 5/2011 | Arbo et al. | |
| 2011/0131130 A1 | 6/2011 | Griffin et al. | |
| 2011/0145056 A1 | 6/2011 | Sullivan et al. | |
| 2011/0213686 A1 | 9/2011 | Ferris et al. | |
| 2011/0275344 A1 | 11/2011 | Momtahan et al. | |
| 2012/0010933 A1 | 1/2012 | Satyavolu et al. | |
| 2012/0016858 A1 | 1/2012 | Rathod | |
| 2012/0122570 A1 | 5/2012 | Baronoff | |
| 2012/0155296 A1 | 6/2012 | Kashanian | |
| 2012/0173700 A1 | 7/2012 | De Andrade Cajahyba et al. | |
| 2012/0179564 A1 | 7/2012 | Soroca et al. | |
| 2012/0185368 A1 | 7/2012 | Schloter et al. | |
| 2012/0197794 A1 | 8/2012 | Grigg et al. | |
| 2012/0215640 A1 | 8/2012 | Ramer et al. | |
| 2012/0221446 A1 | 8/2012 | Grigg et al. | |
| 2012/0330971 A1 | 12/2012 | Thomas et al. | |
| 2013/0006883 A1 | 1/2013 | McKeown et al. | |
| 2013/0024203 A1 | 1/2013 | Flores et al. | |
| 2013/0041819 A1 | 2/2013 | Khasho | |
| 2013/0054681 A1 | 2/2013 | Coyne | |
| 2013/0080641 A1 | 3/2013 | Lui et al. | |
| 2013/0110640 A1 | 5/2013 | Powell et al. | |
| 2013/0176908 A1 | 7/2013 | Baniel et al. | |
| 2013/0227027 A1 | 8/2013 | May et al. | |
| 2013/0262312 A1 | 10/2013 | Carlson et al. | |
| 2013/0325598 A1 | 12/2013 | Shao et al. | |
| 2013/0325681 A1 | 12/2013 | Somashekar et al. | |
| 2013/0325769 A1 * | 12/2013 | Downs | G06F 17/2745 706/18 |
| 2014/0025491 A1 | 1/2014 | Nagarajan et al. | |
| 2014/0136381 A1 | 5/2014 | Joseph et al. | |
| 2014/0172560 A1 | 6/2014 | Satyavolu et al. | |
| 2014/0207584 A1 | 7/2014 | Wicha et al. | |
| 2014/0236846 A1 | 8/2014 | Melika et al. | |
| 2014/0278755 A1 | 9/2014 | Eberl et al. | |
| 2014/0279639 A1 | 9/2014 | Cooper et al. | |
| 2014/0279800 A1 | 9/2014 | Anastasopoulos | |
| 2014/0289154 A1 | 9/2014 | Cooper et al. | |

(56) References Cited

U.S. PATENT DOCUMENTS

| | | |
|---|---|---|
| 2014/0289386 A1 | 9/2014 | Vatto et al. |
| 2014/0335819 A1 | 11/2014 | Jahr |
| 2014/0365354 A1 | 12/2014 | Shvarts |
| 2015/0026053 A1 | 1/2015 | Calman et al. |
| 2015/0046307 A1 | 2/2015 | Calman et al. |
| 2015/0079929 A1 | 3/2015 | McNamee et al. |
| 2015/0082458 A1 | 3/2015 | Cooper et al. |
| 2015/0095132 A1 | 4/2015 | Van Heerden et al. |
| 2015/0161671 A1 | 6/2015 | Watkeys |
| 2015/0351075 A1 | 12/2015 | Korver et al. |
| 2015/0379582 A1 | 12/2015 | Jain et al. |
| 2016/0034588 A1 | 2/2016 | Hyatt et al. |
| 2016/0034834 A1 | 2/2016 | Snell et al. |
| 2016/0048698 A1 | 2/2016 | Sahu et al. |
| 2016/0080485 A1* | 3/2016 | Hamedi ............ G06F 16/24578 709/204 |
| 2016/0198322 A1 | 7/2016 | Pitis |
| 2016/0267597 A1 | 9/2016 | Johansen et al. |
| 2016/0274744 A1 | 9/2016 | Neumann et al. |
| 2016/0275436 A1 | 9/2016 | Kurjanowicz et al. |
| 2016/0314251 A1* | 10/2016 | Pratsevall Garcia ....................... G06F 19/326 |
| 2016/0353237 A1 | 12/2016 | Shepherd et al. |
| 2016/0353386 A1 | 12/2016 | Sasidharan et al. |
| 2016/0379107 A1 | 12/2016 | Li et al. |
| 2017/0011398 A1 | 1/2017 | Narasimhan |
| 2017/0013440 A1 | 1/2017 | Ostling |
| 2017/0078861 A1 | 3/2017 | McNamee et al. |
| 2017/0236131 A1* | 8/2017 | Nathenson ......... G06Q 30/0201 705/26.7 |
| 2018/0018158 A1 | 1/2018 | Kalke et al. |
| 2018/0063018 A1 | 3/2018 | Bosch et al. |
| 2018/0225754 A1 | 8/2018 | Del Vecchio et al. |

FOREIGN PATENT DOCUMENTS

| | | |
|---|---|---|
| CA | 2634626 A1 | 1/2010 |
| CN | 103677488 A1 | 3/2014 |
| WO | 2004023451 A1 | 3/2004 |
| WO | 2006107799 A1 | 10/2006 |
| WO | 2007014201 A2 | 2/2007 |
| WO | 2008072255 A2 | 6/2008 |
| WO | 2008076997 A1 | 6/2008 |
| WO | 2014153128 A1 | 9/2014 |
| WO | 2014157891 A1 | 10/2014 |
| WO | 2014200692 A1 | 12/2014 |

* cited by examiner

LEVERAGING AN ARTIFICIAL INTELLIGENCE ENGINE TO GENERATE CUSTOMER-SPECIFIC USER EXPERIENCES BASED ON REAL-TIME ANALYSIS OF CUSTOMER RESPONSES TO RECOMMENDATIONS

CROSS-REFERENCE TO RELATED APPLICATION

This application is a divisional of and claims priority from allowed, co-pending U.S. patent application Ser. No. 15/288,565, filed on Oct. 7, 2016 and entitled "Leveraging an Artificial Intelligence Engine to Generate Customer-Specific User Experiences Based on Real-Time Analysis of Customer Responses to Recommendations".

BACKGROUND

Allocation of resources can be a difficult process. Improper allocation or reallocation of resources decreases the efficiency of the entity systems as the process of allocation of resources involves different processes. Thus, there exists a need for a system to facilitate proper allocation of resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses for facilitating an artificial intelligence engine that generates customer-specific user experiences based on real-time analysis of customer responses to recommendations and/or features.

According to embodiments of the invention, a system includes a network communication interface; a memory device storing executable code; and a processing device operatively coupled to the memory device, where the processing device is configured to execute computer-readable program code to access a profile of an end user comprising at least one first characteristic associated with the end user and extract end user information from a database of an entity server; identify a first trend related to resource utilization and/or management implemented by the end user based on the extracted end user information; access a comprehensive set of profiles associated with a comprehensive set of users not including the end user; determine a subset of profiles of the comprehensive set of profiles, each of the subset of profiles associated with at least one of a plurality of users of the comprehensive set of users, and each of the subset of profiles comprising at least one second characteristic associated with its associated plurality of users, wherein determining the subset of profiles comprises for each profile of the comprehensive set of profiles, comparing the at least one first characteristic of the end user with the at least one second characteristic of the comprehensive set of users to determine whether they match, thereby resulting in a matching subset of profiles, wherein the process of matching is performed based at least in part on comparison parameters; in response to determining the matching subset of profiles, extract user information related to the matching subset of profiles from the database of the entity server; identify a second trend related to resource utilization and/or management implemented by the matching subset of profiles based on the information extracted from the matching subset of profiles; compare the first trend and the second trend to determine an opportunity for improving end user resource utilization and/or resource management exists; determine the opportunity; and, in response to determining the opportunity, transmit control signals configured to cause the graphical user interface of the device of the end user to display graphically the determined opportunity to the end user.

In some embodiments, the processing device is further configured to execute computer-readable program code to continuously monitor the end user information for any changes; automatically update the first trend after detecting changes to the end user information; and transmit control signals configured to cause the graphical user interface of the device of the end user to display an updated opportunity.

In some embodiments, the first characteristic includes at least one of time period of existence range, zip code, salary range, location, occupation type, number of children, and goals.

In some embodiments, the second characteristic includes at least one of time period of existence range, zip code, salary range, location, occupation type, number of children, transaction history, account summary and goals.

In some embodiments, updating the graphical representation includes sending an alert to the end user.

In some embodiments, the processing device is further configured to execute computer-readable program code to transmit control signals configured to cause the graphical user interface of the device of the end user to receive a selection input of at least one recommendation. In some such embodiments, the processing device is further configured to execute computer-readable program code to in response to receiving the selection of at least one recommendation from the device of the end user, implement the at least one recommendation selected by the end user.

In some embodiments, the processing device is further configured to execute computer-readable program code to transmit control signals configured to cause the graphical user interface of the device of the end user to receive a declining input declining to select at least one recommendation.

In some embodiments, the processing device is further configured to execute computer-readable program code to transmit control signals configured to cause the graphical user interface of the device of the end user to receive an input selecting at least one recommendation, thereby indicating a positive response to the at least one recommendation, or declining all the recommendations, thereby indicating a negative response to all the recommendations. In some such embodiments, the processing device is further configured to execute computer-readable program code to determine, based on failure to receive an input selecting at least one recommendation, that the end user has a negative response to the at least one recommendation. In other such embodiments, the processing device is further configured to execute computer-readable program code to, based on one or more negative responses and/or positive responses, determine that the end user correlates to a modified interface; and transmit control signals configured to cause the graphical user interface of the device of the end user to change from a standard interface profile to a modified interface profile. In some such embodiments, determining that the end user correlates to a modified interface comprises performing a database lookup to determine which of a plurality of recommendation profiles the end user matches, based on the one or more negative responses and/or positive responses.

According to embodiments of the invention, a system for generating customer-specific user experiences based on real-time analysis of customer responses to recommendations, the system comprising a network communication interface; a memory device storing a resource utilization and management application; and a processing device operatively coupled to the memory device, wherein the processing device is configured to execute computer-readable program code to access a profile of an end user comprising at least one first characteristic associated with the end user and extract end user information from a database of an entity server; identify a first trend related to resource utilization and/or management implemented by the end user based on the extracted end user information; determine an opportunity based on the identified first trend; in response to determining the opportunity, transmit control signals configured to cause the graphical user interface of the device of the end user to display graphically at least one recommendation based on the determined opportunity to the end user; transmit control signals configured to cause the graphical user interface of the device of the end user to receive an input selecting at least one recommendation, thereby indicating a positive response to the at least one recommendation, or declining all the recommendations, thereby indicating a negative response to all the recommendations; based on one or more negative responses and/or positive responses, determine that the end user correlates to a modified interface; and transmit control signals configured to cause the graphical user interface of the device of the end user to change from a standard interface profile to a modified interface profile.

In some embodiments, the processing device is further configured to execute computer-readable program code to continuously monitor the end user information for any changes; automatically update the first trend after detecting changes to the end user information; and transmit control signals configured to cause the graphical user interface of the device of the end user to display an updated opportunity.

In some embodiments, the first characteristic includes at least one of time period of existence range, zip code, salary range, location, occupation type, number of children, and goals.

In some embodiments, the second characteristic includes at least one of time period of existence range, zip code, salary range, location, occupation type, number of children, transaction history, account summary and goals.

In some embodiments, updating the graphical representation includes sending an alert to the end user.

According to embodiments of the invention, a system for generating customer-specific user experiences based on real-time analysis of customer responses to recommendations, the system comprising a network communication interface; a memory device storing a resource utilization and management application; a processing device operatively coupled to the memory device, wherein the processing device is configured to execute computer-readable program code to initiate presentation of a graphical user interface to an end user; transmit control signals configured to cause the graphical user interface of the device of the end user to display graphically at least one feature; transmit control signals configured to cause the graphical user interface of the device of the end user to receive an input selecting at least one feature, thereby indicating a positive response to the at least one feature, or declining all the feature, thereby indicating a negative response to all the features; based on one or more negative responses and/or positive responses, determine that the end user correlates to a modified interface by performing a database lookup to determine which of a plurality of feature profiles the end user matches, based on the one or more negative responses and/or positive responses; and transmit control signals configured to cause the graphical user interface of the device of the end user to change from a standard interface profile to a modified interface profile.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
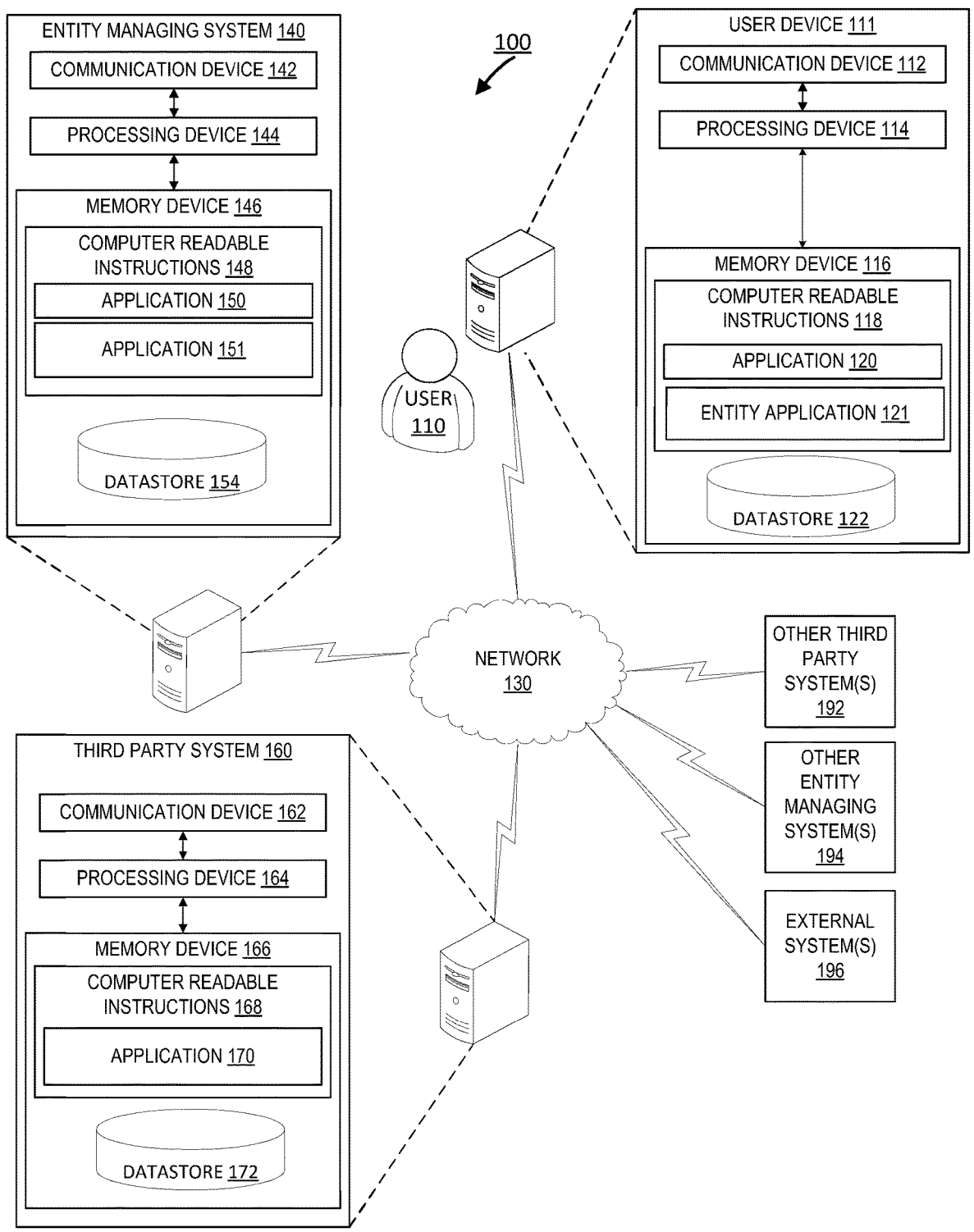
Figure 2A:
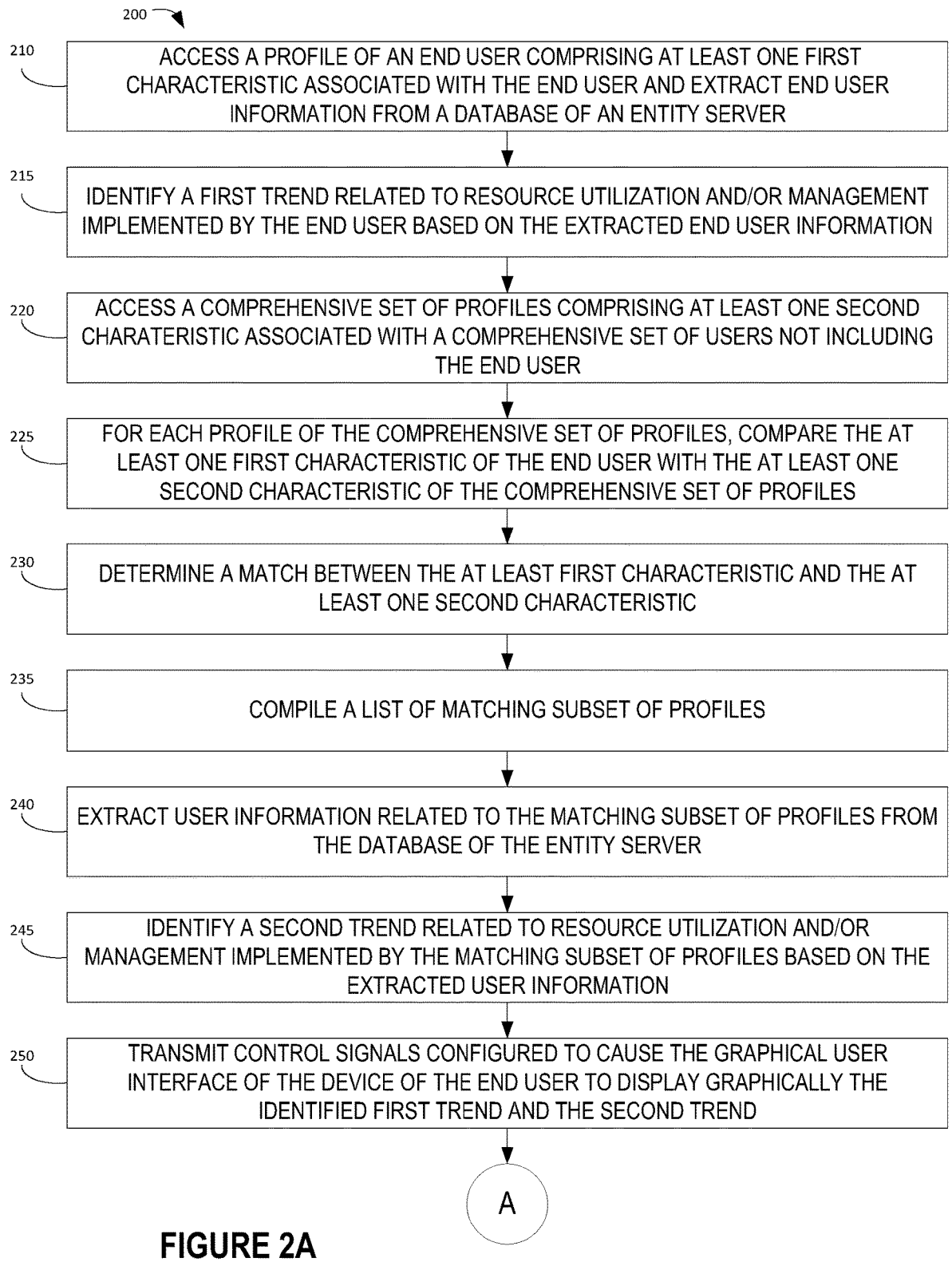
Figure 2B:
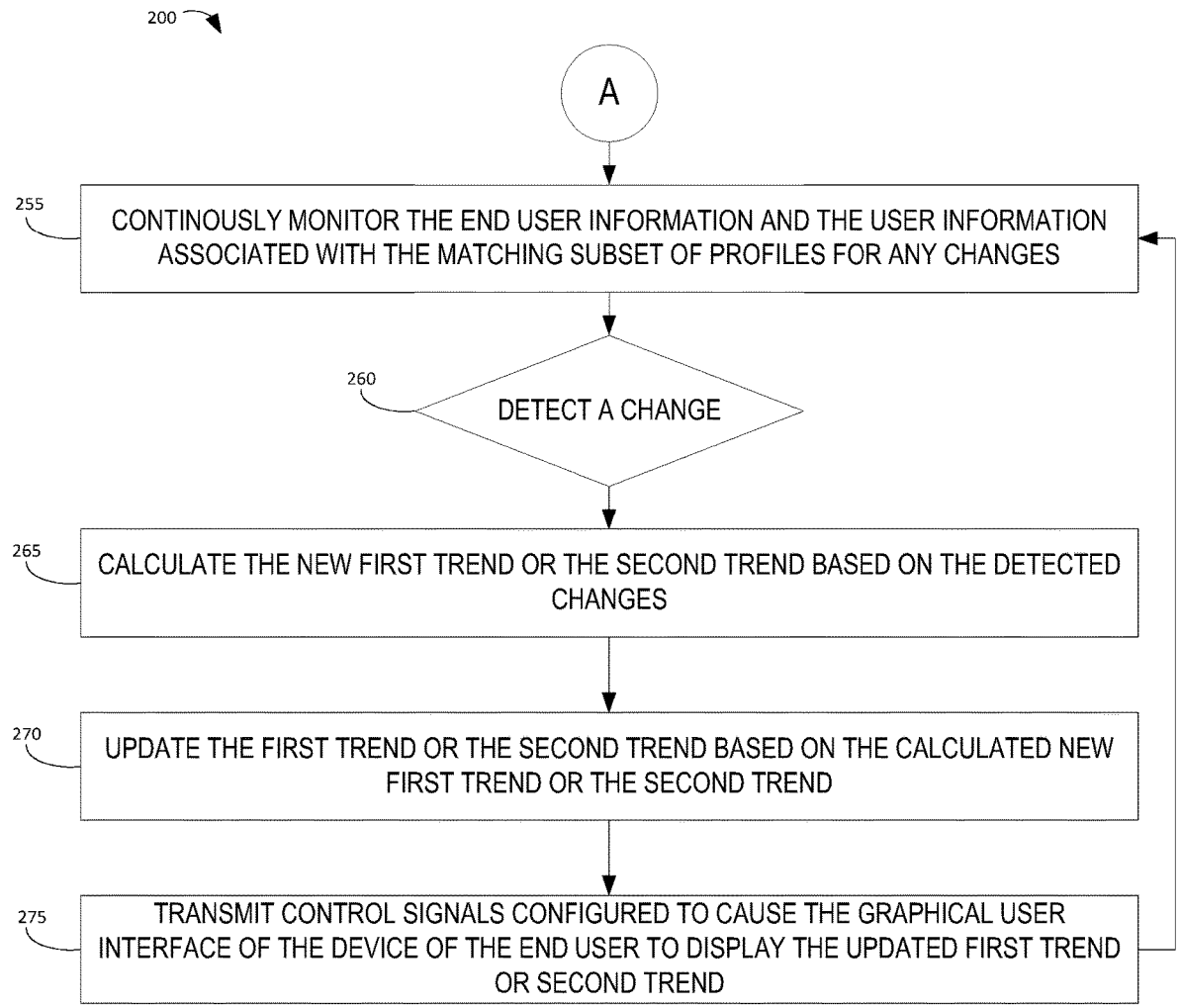
Figure 3:
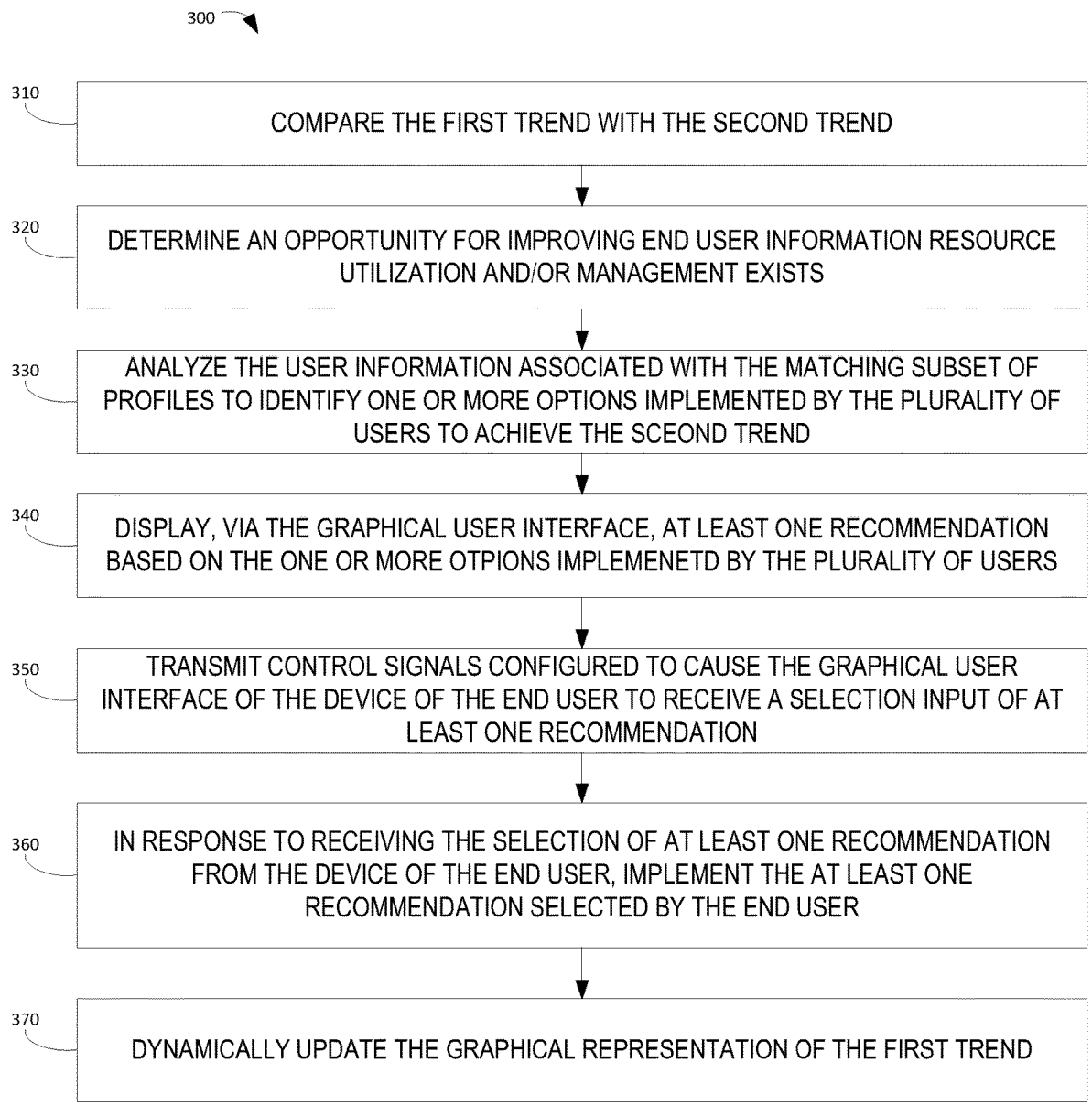
Figure 4A:
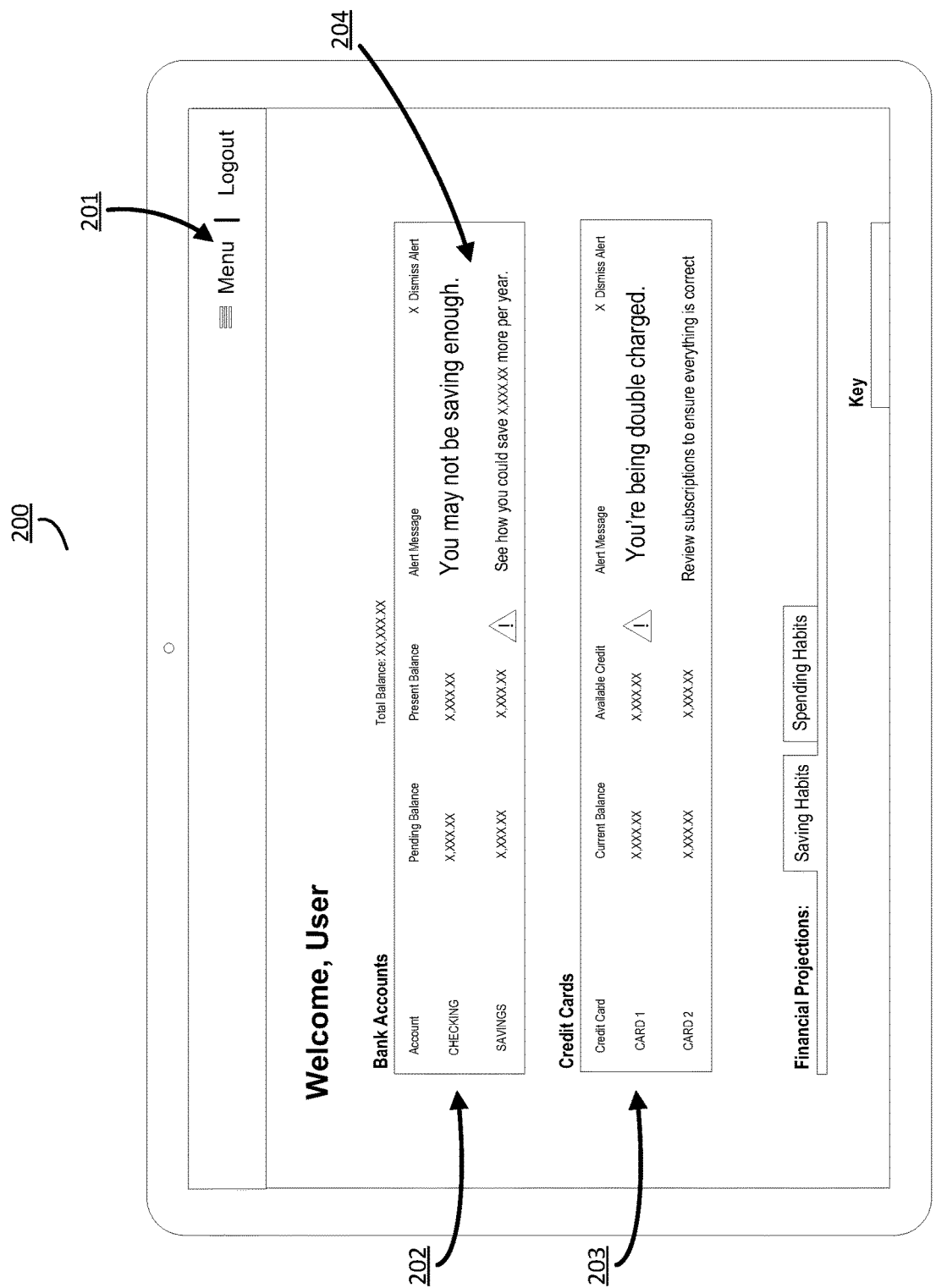
Figure 4B:
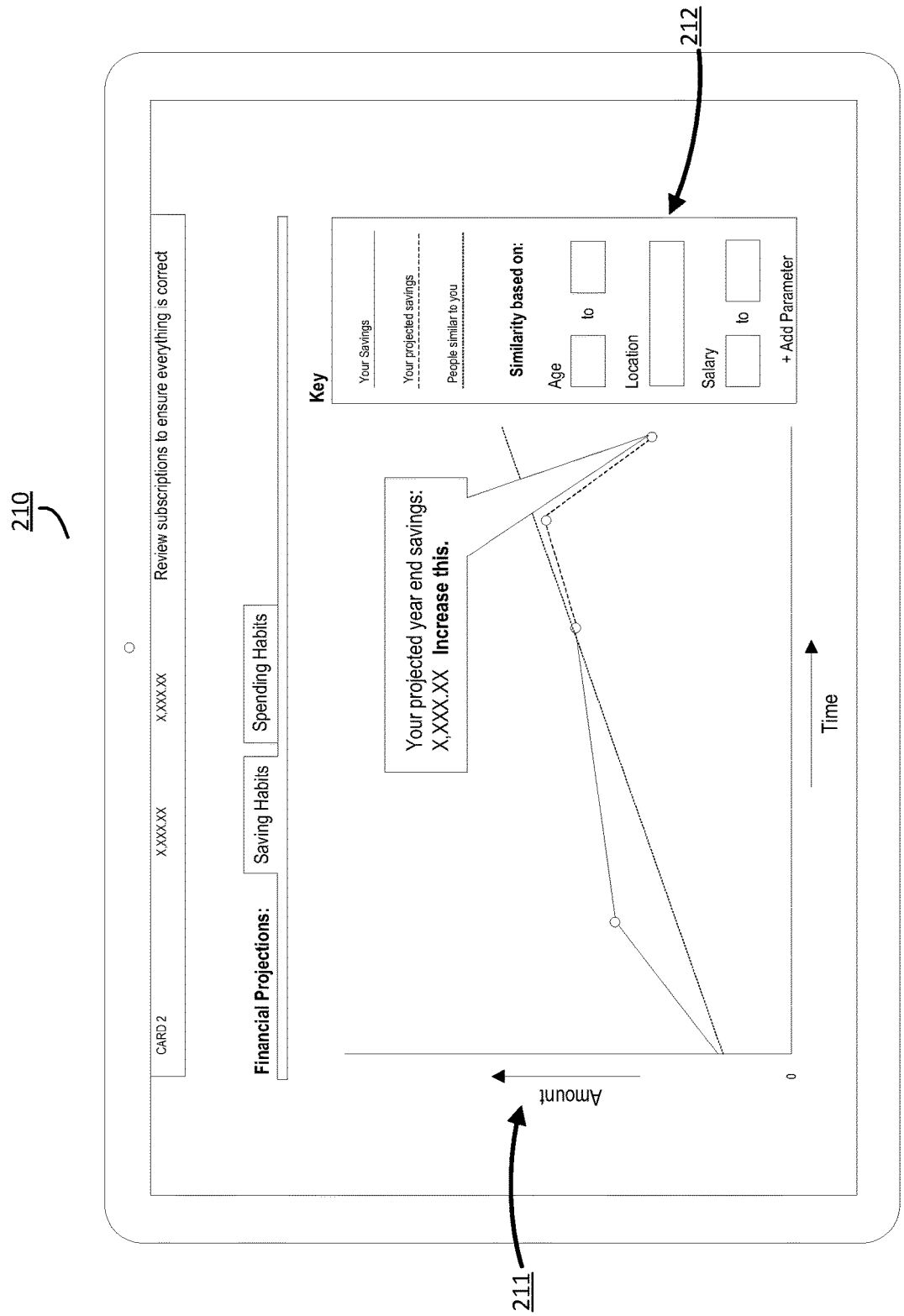
Figure 4C:
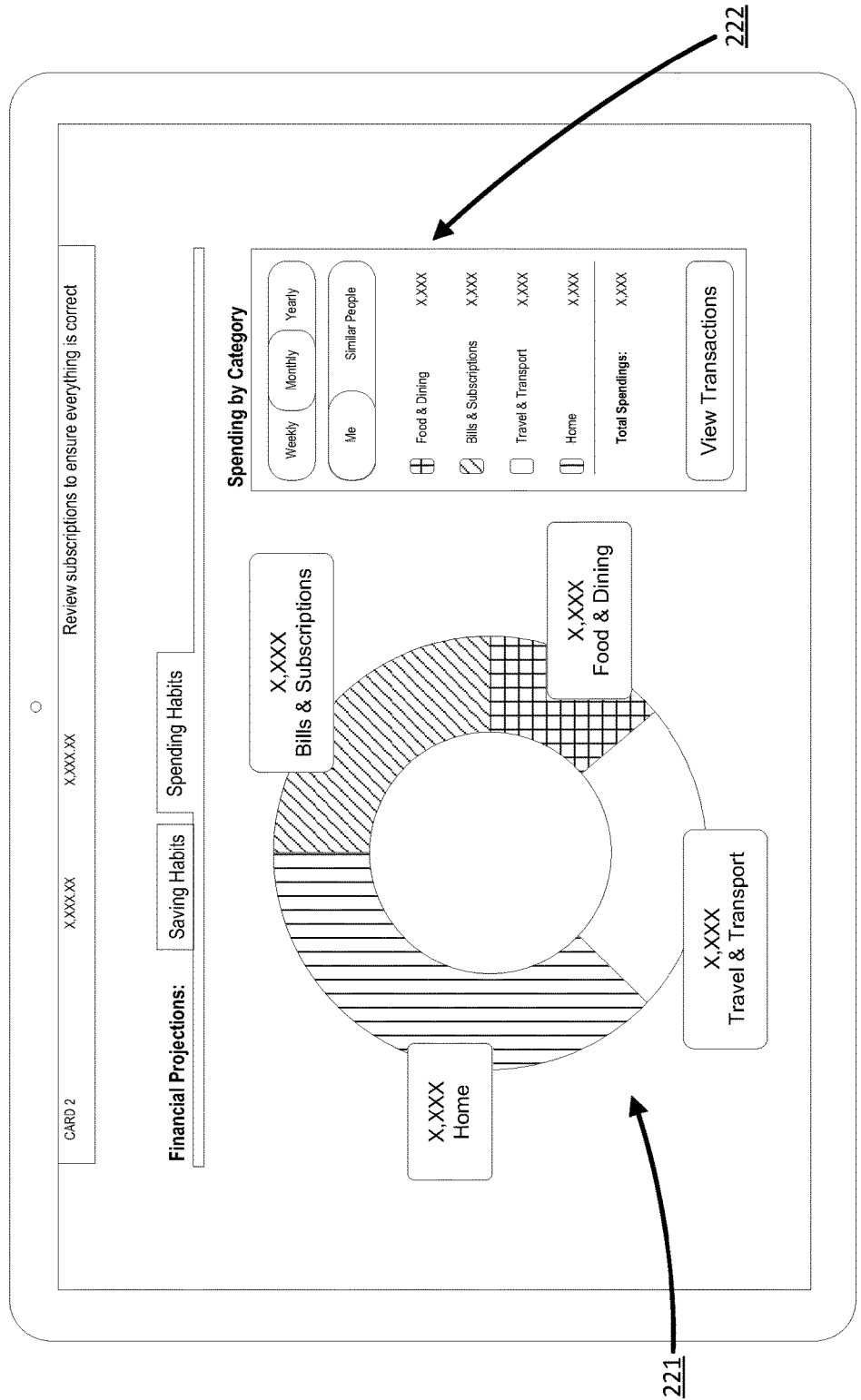
Figure 4D:
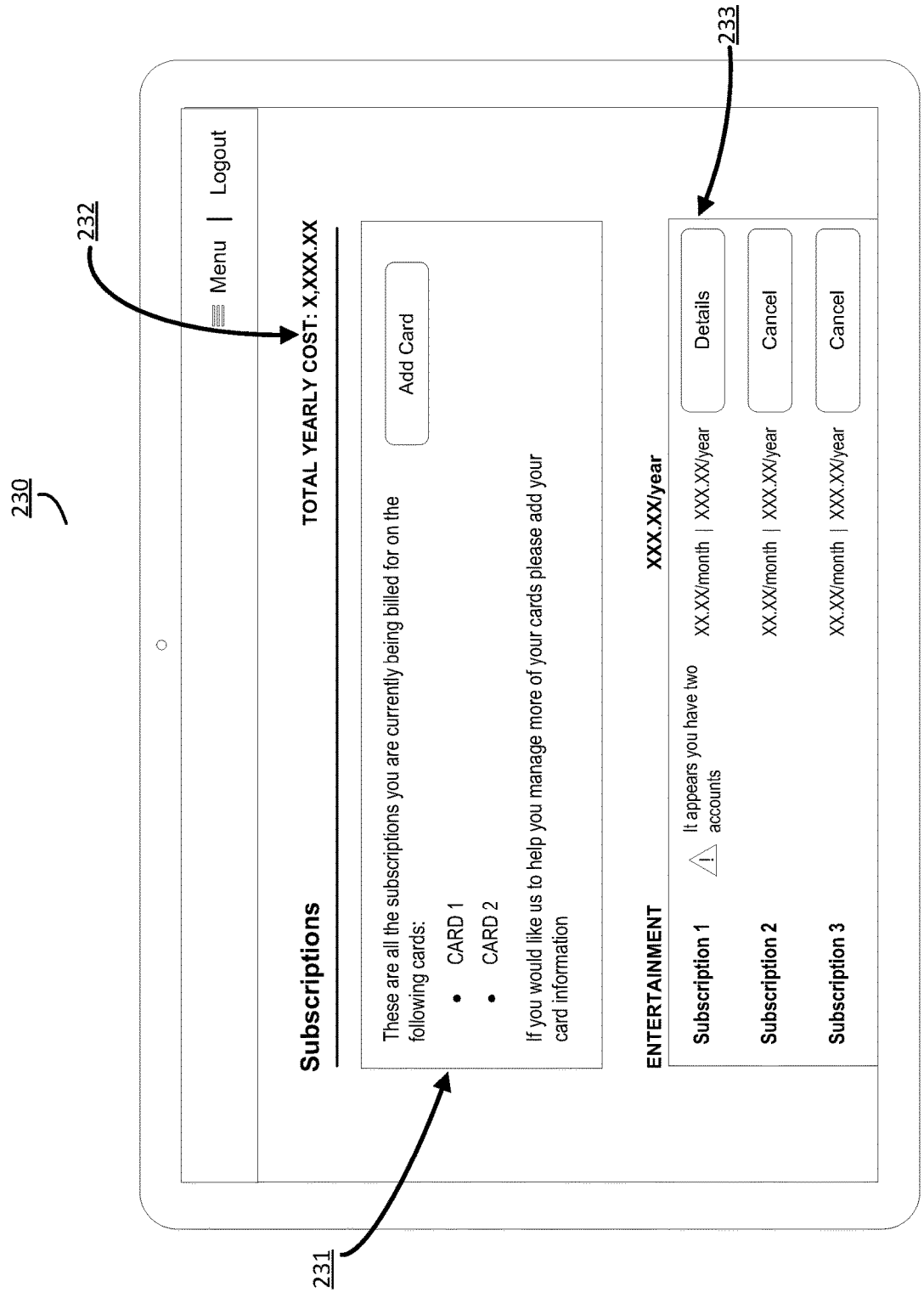
Figure 5:
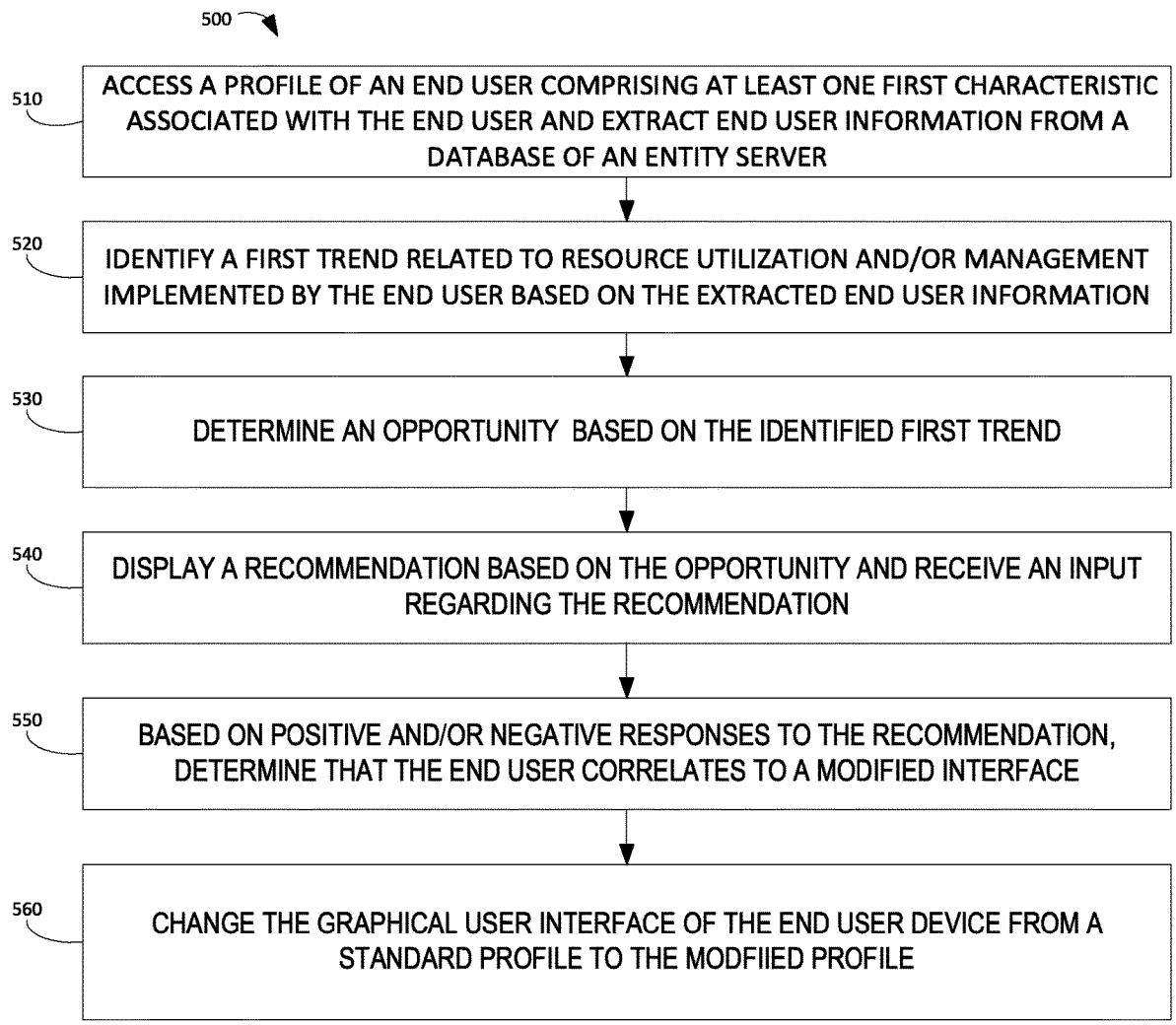

Having thus described embodiments of the invention in general terms, reference will now be made to the accompanying drawings, wherein:

FIG. 1 provides a system environment in which embodiments of the invention operate, in accordance with one embodiment of the present invention;

FIG. 2A and FIG. 2B illustrate a process flow for dynamically generating and modifying the graphical representation of resource utilization and/or management of an end user;

FIG. 3 illustrates process flow for providing recommendations to the end user based on the user information related to a plurality of users;

FIG. 4A illustrates a graphical representation of a portion of a entity application user interface, in accordance with some embodiments of the invention;

FIG. 4B illustrates a graphical representation of a portion of a entity application user interface for monitoring asset savings, in accordance with some embodiments of the invention;

FIG. 4C illustrates a graphical representation of a portion of a entity application user interface for monitoring asset spending, in accordance with some embodiments of the invention;

FIG. 4D illustrates a graphical representation of a portion of a entity application user interface for monitoring subscriptions, in accordance with some embodiments of the invention; and FIG. 5 illustrates a flowchart of a method for facilitating an artificial intelligence engine that generates customer-specific user experiences based on real-time analysis of customer responses to recommendations and/or features facilitating an artificial intelligence engine that generates customer-specific user experiences based on real-time analysis of customer responses to recommendations and/or features according to embodiments of the invention.

DETAILED DESCRIPTION OF THE INVENTION

Embodiments of the invention provide for generating and modifying a user experience based on real-time analysis of tracked responses to stimuli. Modification of user experiences improves human-computer interaction by providing interface tailored to illicit responses from the individual at a higher rate than standard user interfaces. In this regard, the invention enables the system and network resources to operate in a more efficient manner with regard to the specific human-computer interaction and, therefore, resources such as memory usage and processing capacity surpluses are available for use by other processes. For example, the artificial intelligence engine of the present invention may learn about the trends of the human-computer interaction, modify the user experience to best conform with the particular user's patterns and positive reactions to stimuli, and therefore, the modified user experience will operate in a more effective and efficient manner, thereby achieving milestones, such as navigation to desired content, purchase of a desired product, presenting answers to questions or the like, in a faster timeframe than a standard interface. Thus, embodiments of the invention provide a technological improvement to the specific field of user experience and interfaces by providing user-specialized human-computer interactions configured to attain the goals of the human and/or the computer more quickly, thereby freeing computing resources for other uses.

Various embodiments of this invention enable suggestions for improving the customer's finances such as by increasing savings. An artificial intelligence learning engine determines which of multiple personality types best matches the customer. For example, the customer may demonstrate that humor-based or fact-based messaging regarding their finances is preferred by responding to (accepting or denying) suggestions made by the app. The app may assist the customer by aggregating spending from similar types of merchants to provide customer insight into their spending habits. Such aggregation may additionally be based on SKU-level data and/or categorization of purchases. Failure to act (rather than an actual acceptance or denial) may be used by the AI engine as a negative response as well. The app may track which pages people prefer, how long they view particular pages and may connect alerts back to the online banking or bank website via links. The online banking website UX may be changed based on the way the customers react to the recommendations.

In some embodiments, Embodiments leverage an artificial intelligence engine to generate customer-specific user experiences based on real-time analysis of customer responses to recommend and/or experienced features. Some embodiments access a profile of an end user comprising at least one first characteristic associated with the end user and extract end user information from a database of an entity server; identify a first trend related to resource utilization and/or management implemented by the end user based on the extracted end user information; determine an opportunity based on the identified first trend; in response to determining the opportunity, transmit control signals configured to cause the graphical user interface of the device of the end user to display graphically at least one recommendation based on the determined opportunity to the end user; and receive an input selecting or declining at least one recommendation. These inputs may correlate to a modified interface experience.

Some embodiments of the present invention are directed to a real-time dynamic graphical representation system for efficient resource utilization and management. The system accesses the profile information of the end user and extracts the resource information related to the end user. Based on the extracted resource information, the system identifies a first trend related to resource utilization and another first trend related to resource management. The system then accesses a comprehensive set of profiles and compares the extracted end user profile information with the comprehensive set of profiles to determine a matching subset of profiles. The subset of profiles match the profile of the end user, wherein the process of matching is based on comparison parameters such as time period of existence range, city, number of children, goals and/or the like. The system accesses the resource information related to a plurality of users associated with the subset of profiles and identifies a second trend related to resource utilization and resource management. The system displays the graphical representation of identified trends on the device of the end user. The system provides a technical solution to the problem of improper allocation of resources by providing one or more recommendations to the end user based on the identified second trend, wherein the end user selects at least one recommendation. Upon receiving the at least one recommendation from the end user, the system implements the recommendation and updates the graphical representation of the first trend and the second trend. Proper allocation of resources minimizes the need to repeat processes involved in resource allocation. Thus, embodiments of the invention provide a technological improvement by improving the efficiency of the processing device of the entity system.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity. "Assets" include accounts of the user and/or other property owned by the user. The assets may be associated with accounts or may be property that is not associated with a specific account. Examples of assets associated with accounts may be accounts that have cash or cash equivalents, or accounts that are funded with or contain property, such as safety despots box account that jewelry, a trust account that is funded with property, or the like. Examples of assets that may not be associated with accounts may be antiques in a user's home, jewelry in a user's home, or the like. "Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system.

An "entity" as used herein may be a financial institution. For the purposes of this invention, a "financial institution"

may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. A "financial event" or "life event" may be any immediate or future event that causes a change in a user's financial status. A financial event may be a charge, a transaction, and exchange, or the like that may cause the user to lose or gain money and/or assets. Examples of financial events or life events include a medical expense, buying a house, college tuition, rent, moving to a new city, receiving a raise or bonus in pay and the like. To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information. A "transaction" refers to any communication between a user and the financial institution or other entity monitoring the user's activities. A transaction may also refer to any communication between a user and a third party. For example, a transaction may refer to a purchase of goods or services, a return of goods or services, a payment transaction, a credit transaction, or other interaction involving a user's account. In the context of a financial institution or third party, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, digital items and the like); making payments to creditors (e.g., paying monthly bills; paying federal, state, and/or local taxes; and the like); sending remittances; loading money onto stored value cards (SVCs) and/or prepaid cards; donating to charities; and/or the like. An "end user" may be a financial institution customer (e.g., an account holder or a person who have an account (e.g., banking account, credit account, or the like)). In one aspect, an end user may be any financial institution customer involved managing spending and accounts with the financial institution or any other affiliate entities associated with the financial institution. In some embodiments, the end user may be an individual who may be interested in opening an account with the financial institution. In some embodiments, an "end user" may be a financial institution employee (e.g., an underwriter, a project manager, an IT specialist, a manager, an administrator, an internal operations analyst, bank teller or the like) capable of operating the system described herein. For purposes of this invention, the term "end user", "user", and "customer" may be used interchangeably. A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Referring now to FIG. 1, the figure illustrates a processing system environment 100, in accordance with some embodiments of the invention. The environment 100 includes a user device 111 associated or used with authorization of a user 110 (e.g., an account holder, a mobile application user, a bank customer, and the like), a third party system 160, and an entity managing system 140. In some embodiments, the third party system 160 corresponds to a third party entity. The environment 100 further includes one or more third party systems 192 (e.g., a partner, agent, or contractor associated with a financial institution), one or more other entity managing systems 194 (e.g., a credit bureau, third party banks, and so forth), and one or more external systems 196.

The systems and devices communicate with one another over the network 130 and perform one or more of the various steps and/or methods according to embodiments of the disclosure discussed herein. The network 130 may include a local area network (LAN), a wide area network (WAN), and/or a global area network (GAN). The network 130 may provide for wireline, wireless, or a combination of wireline and wireless communication between devices in the network. In one embodiment, the network 130 includes the Internet.

The user device 111, the third party system 160, and the entity managing system 140 each includes a computer system, server, multiple computer systems and/or servers or the like. The entity managing system 140, in the embodiments shown has a communication device 142 communicably coupled with a processing device 144, which is also communicably coupled with a memory device 146. The processing device 144 is configured to control the communication device 142 such that the financial institution system 140 communicates across the network 130 with one or more other systems. The processing device 144 is also configured to access the memory device 146 in order to read the computer readable instructions 148, which in some embodiments includes one or more applications such as applications 150 and 151. The memory device 146 also includes a datastore 154 or database for storing pieces of data that can be accessed by the processing device 144.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 114, 144, or 164 may further include functionality to operate one or more software programs based on computer-executable program code thereof, which may be stored in a memory. As the phrase is used herein, a processing device 114, 144, or 164 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 146 includes any computer memory that provides an actual or virtual space to temporarily or permanently store data and/or commands provided to the processing device 144 when it carries out its functions described herein.

The user device 111 includes a communication device 112 communicably coupled with a processing device 114, which is also communicably coupled with a memory device 116. The processing device 114 is configured to control the communication device 112 such that the user device 111 communicates across the network 130 with one or more other systems. The processing device 114 is also configured to access the memory device 116 in order to read the computer readable instructions 118, which in some embodiments includes application 120 and online entity application 121. The memory device 116 also includes a datastore 122 or database for storing pieces of data that can be accessed by the processing device 114. The user device 111 may be a mobile device of the user 110, a bank teller device, a third party device, an automated teller machine, a video teller machine, or another device capable of capturing a check image.

The third party system 160 includes a communication device 162 communicably coupled with a processing device 164, which is also communicably coupled with a memory device 166. The processing device 164 is configured to control the communication device 162 such that the third party system 160 communicates across the network 130 with one or more other systems. The processing device 164 is also configured to access the memory device 166 in order to read the computer readable instructions 168, which in some embodiments includes an application 170. The memory device 166 also includes a datastore 172 or database for storing pieces of data that can be accessed by the processing device 164.

In some embodiments, the application 120, the online entity application 121, and the application 170 interact with the application 150 or 151 to receive or provide financial data, analyze financial record data, and implement business strategies, transactions, and processes. The applications 150 and 151 may be a suite of applications for performing these functions.

In some embodiments, the application 120, the online entity application 121, and the application 170 interact with the applications 150 and 151 to utilize metadata to determine decisions for processing.

The applications 120, 121, 150, 151, and 170 are for instructing the processing devices 114, 144 and 164 to perform various steps of the methods discussed herein, and/or other steps and/or similar steps. In various embodiments, one or more of the applications 120, 121, 150, 151, and 170 are included in the computer readable instructions stored in a memory device of one or more systems or devices other than the systems 160 and 140 and the user device 111. For example, in some embodiments, the application 120 is stored and configured for being accessed by a processing device of one or more third party systems 192 connected to the network 130. In various embodiments, the applications 120, 121, 150, 151, and 170 stored and executed by different systems/devices are different. In some embodiments, the applications 120, 121, 150, 151, and 170 stored and executed by different systems may be similar and may be configured to communicate with one another, and in some embodiments, the applications 120, 121, 150, 151, and 170 may be considered to be working together as a singular application despite being stored and executed on different systems.

In various embodiments, one of the systems discussed above, such as the entity managing system 140, is more than one system and the various components of the system are not collocated, and in various embodiments, there are multiple components performing the functions indicated herein as a single device. For example, in one embodiment, multiple processing devices perform the functions of the processing device 144 of the entity managing system 140 described herein. In various embodiments, the entity managing system 140 includes one or more of the external systems 196 and/or any other system or component used in conjunction with or to perform any of the method steps discussed herein. For example, the entity managing system 140 may include a financial institution system, a credit agency system, and the like.

In various embodiments, the entity managing system 140, the third party system 160, and the user device 111 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

Now referring to FIG. 2, the figure illustrates a process flow 200 for dynamically generating and modifying the graphical representation of resource utilization and/or management. At block 210, the process includes accessing a profile of an end user comprising at least one first characteristic associated with the end user and extracting end user information from a database of an entity server. In some embodiments, the "end user" may be defined as any user associated with an entity, wherein the resource utilization and management application displaying the graphical representation is maintained by the entity holding the account of the end user. In some embodiments, the system initiates the process of extracting end user information after determining that the end user is enrolled in the system. The at least one first characteristic may be defined as time period of existence group, zip code, salary, location, occupation type, number of children, goals and/or the like. The system also extracts the end user information such as transaction history comprising transactions associated with resource utilization and/or resource management, account summary, most recent transactions and/or the like from all accounts associated with the end user. For example, if the end user has a credit account, an investment account, a savings account, and a checking account, the system extracts transaction history comprising transactions related to savings and/or expenses, most recent transactions, and account summary of all the accounts.

As shown in block 215, the system identifies a first trend related to resource utilization and/or management implemented by the end user based on the extracted end user information. For example, the system identifies a trend related to spent expenses or savings plan implemented by the end user based on the transaction history, most recent transaction list, and account summary extracted by the system. The term trend may be an average, median, slope or the like. The trend in the present application refers to a trend line used to represent the behavior of a set of data to determine a certain pattern exists. The trend line is an analytical tool which may be used to predict unknown or future data points. In some embodiments, the trend is a positive trend. In some other embodiments, the trend is a negative trend. In some embodiments, the trend related to resource utilization is defined as trend line of all the transactions associated with expenditure. For example, the system analyzes the expenses related to all the accounts associated with the end user and calculates a trend line representing an average of expenses over a period of time. In some embodiments, the trend related to resource management is defined as an average of all the transactions associated with savings. For example, the system analyzes the savings related to all the accounts associated with the end user and calculates a trend line representing an average of savings over a period of time.

Next, as shown in block 220, the system accesses a comprehensive set of profiles comprising at least one second characteristic associated with a comprehensive set of users not including the end user. The at least one second characteristic may be defined as time period of existence range, zip code, salary range, location, occupation type, number of children, goals and/or the like. In some embodiments, the comprehensive set of profiles may be stored in the database of an entity system. In some embodiments, the comprehensive set of profile may be stored in the database of a third party system.

As shown in block 225, for each profile of the comprehensive set of profiles, the system compares the at least one first characteristic of the end user with the at least one second characteristic of the comprehensive set of profiles. In some embodiments, the system compares more than one first characteristic associated with the end user with more than one second characteristic associated with the comprehensive set of users. For example, the system compares the time period of existence group, location, number of children with time period of existence group, location, number of children associated with the comprehensive set of profiles. In some embodiments, the system compares one first characteristic associated with the end user with one second characteristic associated with the comprehensive set of profiles. For example, the system compares the time period of existence group of the end user with the time period of existence group associated with the comprehensive set of profiles.

As shown in block 230, the system determines a match between the at least first characteristic and the at least one second characteristic. For example, the system determines a match between the time period of existence group of the end user and the time period of existence group of a subset of profiles of the comprehensive set of profiles. In some embodiments, the system determines a match between more than one first characteristic of the end user and more than one second characteristic of a subset of profiles of the comprehensive set of profiles. For example, the system determines a match between the time period of existence group, number of children of the end user and the time period of existence group, number of children of a subset of profiles of the comprehensive set of profiles. In some embodiments, the system determines a match between the at least one first characteristic of the end user with the at least one second characteristic of the comprehensive set of profiles based at least in part on comparison parameters. The comparison parameters may be defined as the range of salary, range of time period of existence group, range of city limit and/or the like. For example, if the user lives in a city X, the system determines a match only if the plurality of users of the comprehensive set of users stay within a 20 miles radius from the end user. In some embodiments, the end user sets the comparison parameters. In some other embodiments, the system sets the comparison parameters.

As shown in block 235, the system compiles a list of matching subset of profiles. The system after accessing the comprehensive set of profiles, compares each of the comprehensive set of profiles with the profile of the end user to determine a match and compile a list of subset of all profiles associated with a plurality of users matching the profile of the end user. For example, the system compares the time period of existence group, range of salary, occupation type and number of children of the end user with the time period of existence group, range of salary, occupation type, and number of children of each of the comprehensive set of profiles to determine all the profiles matching the characteristics of the profile end user. The system then takes the subset of all matching profiles and prepares a list to store it in the database of the entity server.

Next, as shown in block 240, the system extracts user information related to the matching subset of profiles from the database of the entity server. The system extracts transaction data related to savings and expenses associated with all account of the plurality of users. For example, if the system determines that the plurality of users have multiple accounts such as a credit account, an investment account, a checking account, a savings account, or the like, the system extracts transaction history, account summary, the most recent transactions or the like related to all the accounts associated with the plurality of users. In some embodiments, the system anonymizes the identity of the plurality of users while extracting the user information. For example, the system excludes identity of the user such as account number, account name, user name, or any other information which reveals the identity of the plurality of users while extracting the user information.

The system identifies a second trend related to resource utilization and/or management implemented by the matching subset of profiles based on the extracted user information as shown in block 245. The second trend may be an average, median, slope or the like. In some embodiments, the second trend refers to a trend line used to represent the behavior of a set of data to determine a certain pattern exists. In some embodiments, the trend line is an analytical tool which may be used to predict unknown or future data points. In some embodiments, the trend is a positive trend. In some other embodiments, the trend is a negative trend. In some embodiments, the trend related to resource utilization is defined as trend line of all the transactions associated with expenditure. For example, the system analyzes the expenses related to all the accounts associated with the plurality of users and calculates a trend line representing an average of expenses over a period of time. In some embodiments, the trend related to resource management is defined as an average of all the transactions associated with savings. For example, the system analyzes the savings related to all the accounts associated with the plurality of users and calculates a trend line representing an average of savings over a period of time. In some embodiments, the system may indicate the level of the average of savings. For example, the system identifies the plurality of users associated with matching subset of profiles to be saving in the range of 10 percent to 15 percent of their annual income, the system categorizes the savings to be in level 2. In some embodiments, the levels of savings or expenses may be divided into 10 categories. In some other embodiments, the levels of savings or expenses may be divided into more or less than 10 categories. In some embodiments, the levels of savings or expenses are generated by the system. In some other embodiments, the levels of savings or expenses are generated by the entity system.

Next, as shown in block 250, the system transmits control signals configured to cause the graphical user interface of the device of the end user to display graphically the identified first trend and the second trend. In some embodiments, the graphical representation may be a two dimensional representation including amount of expenses or savings on one axis and time on another axis. In some embodiments, the graphical representation may be a three dimensional representation including amount of expenses on first axis, amount of savings on second axis, and time on third axis. In some embodiments, the graphical representation may be a three dimensional representation including amount of expenses on first axis, any other parameter on second axis, and time on third axis. In some embodiments, the graphical representation may be any one of line plot, dot plot pie chart, bar graph, histograms, and/or the like. In some embodiments, the system transmits control signals configured to cause the graphical user interface of the device of the end user to display the graphs of the first trends and second trends related to resource utilization and resource management in two different tabs, wherein the end user navigates from tab 1 containing the first and second trend related to resource utilization to tab 2 in order to access first and second trend associated with resource management. For example, the system displays a graphical user interface comprising two different tabs for displaying trends related to expenses and savings. In some embodiments, the system transmits control signals configured to cause the graphical user interface of the device of the end user to display the graphs of the first trends and second trends related to resource utilization and resource management in the same tab.

In block 255, the system continuously monitors the end user information and the user information associated with the matching subset of profiles for any changes. The system after displaying the trends associated with resource utilization and resource management, continuously monitors the profile and end user information of the end user and the subset of profiles and the user information related to the plurality of users associated with the subset of profiles for any changes or modifications. In some embodiments, the system monitors the profile of the end user for any change and upon determining a change to the end user profile, the system updates the subset of profiles. For example, the system detects that the end user moves from city 1 to city 2 and the cost of living of city 1 may be lower than city 2 and in response to detecting the change of city, the system compiles a new subset of profiles matching the city 2 criteria. The system repeats the process illustrated from block 220 to block 250. In some embodiments, the profiles associated with the plurality of users for any change and upon determining a change to the profiles updates the subset of profiles. For example, if the system detects that at least one profile from the matching subset of profiles has moved from city 1 to city 2, the system deletes that profile from the matching subset of profiles.

In some embodiments, the system monitors the end user information and the user information associated with the subset of profiles and upon detecting any changes the system calculates a new first trend and/or the second trend based on the detected changes as shown in block 265. For example, the end user may increase the percentage of savings and the system upon detecting the change, calculates the new first trend. In some embodiments, the system monitors the profile of the end user and the profiles associated with the plurality of users for any change and upon determining a change to the profiles updates the subset of profiles and calculates the new first trend and new second trend based on the detected changes.

In some embodiments, the system automatically adjusts a set of parameters based on determining a change. For example, if the end user is enrolled in a savings program which automatically deducts X percent of monthly income to transfer it to the savings account, the system upon detecting a change to the monthly income automatically updates the monthly deductions from X percent to Y percent of the monthly income. In some embodiments, the system automatically adjusts a set of parameters after determining that the end user has given consent to the system to adjust the set of parameters automatically.

In block 270, the system updates the first trend and/or the second trend based on the calculated new first trend and/or the second trend. The system also updates the first trend based on the adjusting the set of parameters. As shown in block 275, the system transmits control signals configured to cause the graphical user interface of the device of the end user to display the updated first trend or second trend based on adjusting the set of parameters and/or based on the new first trend and/or second trend. The system dynamically updates in real time, the graphical representation of the first trend and second trend on the device of the end user automatically after detecting changes to the user information or the profiles of the ends user and/or plurality of users. For example, the system detects a change in the salary of the end user and the system automatically updates the graphical representation of the first trend dynamically. In some embodiments, the system sends a notification to the end user to communicate the changes and the updates to the first trend.

Now referring to FIG. 3, the process flow 300 illustrates providing recommendations to the end user based on the first trend associated with the end user and the second trend associated with the plurality of users related to the matching subset of profiles. As shown in block 310, the system compares the first trend with the second trend. The system compares the identified first trend based on the extracted end user information with the identified second trend based on the extracted user information related to the plurality of users associated with the matching comprehensive set of profiles. In some embodiments, the comparison may be performed by subtracting the first trend from the second trend or by subtracting the second trend from the first trend. In some embodiments, the comparison may be performed by determining the highest average trend among the first trend and the second trend. In some other embodiments, the comparison may be performed by determining the lowest average trend among the first trend and the second trend. For example, the system determines if the trend of savings followed by the end user based on the extracted transaction data is higher or lower than the trend of savings followed by the plurality of users.

As shown in block 320, the system determines an opportunity for improving end user information resource utilization and/or management exists. For example, if the system determines that the trend of savings followed by the end user based on the extracted transaction data is lower than the trend of savings implemented by the plurality of users, the system considers this as an opportunity for improving the trend of savings followed by the end user.

Next, as shown in block 330, the system analyzes the user information associated with the matching subset of profiles to identify one or more options implemented by the plurality of users to achieve the second trend. The system analyzes the end user information extracted in block 210 and the user information related to the plurality of user extracted in block 240 to determine one or more options implemented by the plurality of users to achieve the second trend, wherein the one or more options are not implemented by the end user. For example, the system determines that the plurality of users are enrolled in a savings plan such as keep the change program or the like and further determines that the end user is not enrolled in the same savings plan.

Next as shown in block 340, the system in response to analyzing the user information to determine one or more options implemented by the plurality of users to achieve the second trend, displays, via the graphical user interface, at least one recommendation based on the one or more options implemented by the plurality of users. For example, the system in response to determining that the plurality of users are enrolled in a savings plan such as keep the change program or the like and that the end user is not enrolled in the same savings plan, the system generates a recommendation comprising a message indicating "by enrolling in the savings program the savings trend can by increased by x %" and further comprising a message "by enrolling in the savings program, you can reach your goal within x months". In some embodiments, the recommendation is generated on the graphical representation of the first trend and the second trend. In some other embodiments, the alert may be communicated to the end user by sending a message to the device of the user or the like.

In block 350, the system transmits control signals configured to cause the graphical user interface of the device of the end user to receive a selection of input of at least one recommendation. In some embodiments, the selection of input may be received by clicking on the notification generated on the graphical representation of the first trend and the second trend. In some other embodiments, the selection of input may be presented to the end user in the message sent to the device of the user.

Next, as shown in block 360, in response to receiving the selection of at least one recommendation from the device of the end user, implement the at least one recommendation selected by the end user. For example, the system after providing a graphical user interface to receive a selection of at least one recommendation such as opening a new savings account or enrolling in a new savings plan, the end user selects the recommendation of opening a new savings account and in response to receiving the option, the system initiates the process of opening a new savings account. The at least one recommendation provided by the system helps the end user to allocate the resources and utilize the resources in an efficient manner thereby improving the first trend of the user and also improving the efficiency of the entity system.

In block 370, the system dynamically updates the graphical representation of the first trend after implementing the at least one recommendation. The system updates the trend line related to the first trend of the end user after implementing the at least one recommendation. For example, the system updates the savings trend line for the respective time on one of the axis of graphical representation after opening a new savings account. In some embodiments, the system predicts the future trend by performing calculations based on the implementing the at least one recommendation. For example, after opening a new savings account, the system predicts that the end user may reach the goals X times faster. The goals may defined as a goal set by the user to purchase a product or the like.

In some embodiments, the system predicts an occurrence of a live event or a life change based on the analyzing the extracted end user information. The life change or the life event may be moving from one city to another city, change of jobs, marriage, birth of child, and/or the like. In some embodiments, the system identifies the life change or life event and provides recommendations based on the extracted user information associated with the subset of profiles. For example, the system after predicting the occurrence of a child birth in the near future by analyzing the transaction data such as purchase of crib or multiple transactions at the stores specializing in selling baby products, provides recommendations such as opening a new college funds savings plan or the like to the end user based on the one or more options implemented by the plurality of users who experienced the similar event.

In some embodiments, when the system detects a change to the user information related to the plurality of users affecting the second trend, the system automatically updates the second trend as shown in block 270 and in response to updating the second trend, the system identifies one or more new options by analyzing the changed user information related to the plurality of users as shown in block 330, and displays at least one new recommendation based on the identified one or more new options. The system then implements the at least one new recommendation after receiving the selection of input of at least one new recommendation from the end user and automatically update the graphical representation.

Referring now to FIG. 4A, the figure illustrates a graphical representation of a portion of an entity application user interface 400, in accordance with some embodiments of the invention. In some embodiments, the entity application is the online entity application 121. The user interface allows the user to input information, such as commands or data, into a device, and allows the device to output information to the user. As illustrated in FIG. 4A, in some embodiments, the application presents the user with means for navigating the interface by providing a menu 401. The menu 401 may be a drop-down menu which provides the user with additional interactive selections for navigation within the application. Furthermore, the menu provides a logout option which allows the user to exit the application. Upon logging out or initially launching the application, the user may be prompted by the application to provide authentication information to log in. In some embodiments, the application may provide the user, via the user interface, with information related to one or more accounts associated with the user such as bank accounts 402, credit card accounts 403, and the like. The application my additionally provide alerts 404 to the user such as alerts regarding savings goals, budgets, offers for goods or services and the like. In some embodiments, the alerts may be in-line with the account information associated with the user or even be presented along with individual transactions. In some embodiments, the user may optionally toggle the appearance of alerts so that they may or may not be displayed via the user interface.

Referring now to FIG. 4B, the figure illustrates a graphical representation of a portion of an entity application user interface for monitoring asset savings 410, in accordance with some embodiments of the invention. As illustrated by element 411, the application presents to the end user, via the user interface, a projection of asset savings by monitoring financial information associated with the one or more user accounts as illustrated in blocks 210 and 215. In some embodiments, the projection is presented to the user via a graph, chart, or the like, wherein the user may modify the scale of time of the record to reflect weekly, monthly, yearly spending or the like as illustrated in block 250. Additionally, the application may provide the end user with one or more actionable alerts to allow the end user to modify his or her saving habits as illustrated in block 340. Furthermore, the application may present asset saving habits and projections for a plurality of users associated with the matching subset of profiles determined to be similar to the end user as illustrated from block 220 to block 250. In some embodiments, the application provides one or more interactive fields 412 for the input of parameters used determine the other similar users, such as term of life, location, salary, and the like.

Referring now to FIG. 4C, the figure illustrates a graphical representation of a portion of an entity application user interface for monitoring asset spending 420, in accordance with some embodiments of the invention. As illustrated by element 421, the application presents to the end user, via the user interface, a record of asset spending by monitoring financial information associated with the one or more user accounts. In some embodiments, the record is presented to the end user via a graph, chart, or the like, wherein the user may modify the scale of time of the record to reflect weekly, monthly, yearly spending or the like. Additionally, the application may provide the end user with one or more actionable alerts to allow the end user to modify his or her spending habits. Furthermore, the application may present asset spending habits and projections for other users determined to be similar to the end user. In some embodiments, the application provides one or more interactive fields 422 for the input of parameters used determine the other similar users, such as term of life, location, salary, and the like.

Referring now to FIG. 4D, the figure illustrates a graphical representation of a portion of an entity application user interface for monitoring subscriptions 430, in accordance with some embodiments of the invention. As illustrated by element 431, the application user interface displays credit cards, debit cards, payment accounts, and the like used for the payment of one or more subscriptions associated with the end user. Additionally, the end user is presented with a total cost of the one or more subscriptions associated with the user 432. As illustrated by element 433, the user interface may present the one or more subscriptions to the user and provide actionable alerts to the user such as alerts that identify duplicate subscriptions associated with the end user. The application may present additional details associated with the one or more subscriptions such as cost, sign-up date, renewal data, and the like.

Various embodiments of the system described herein facilitate proper utilization of resources, thereby avoiding reallocation of resources and improving the efficiency of the entity system.

Other embodiments leverage an artificial intelligence engine to generate customer-specific user experiences based on real-time analysis of customer responses to recommend and/or experienced features. Some embodiments access a profile of an end user comprising at least one first characteristic associated with the end user and extract end user information from a database of an entity server; identify a first trend related to resource utilization and/or management implemented by the end user based on the extracted end user information; determine an opportunity based on the identified first trend; in response to determining the opportunity, transmit control signals configured to cause the graphical user interface of the device of the end user to display graphically at least one recommendation based on the determined opportunity to the end user; and receive an input selecting or declining at least one recommendation. These inputs may correlate to a modified interface experience.

Referring now to FIG. 5, a flowchart illustrates a method 500 for facilitating an artificial intelligence engine that generates customer-specific user experiences based on real-time analysis of customer responses to recommendations and/or features facilitating an artificial intelligence engine that generates customer-specific user experiences based on real-time analysis of customer responses to recommendations and/or features according to embodiments of the invention. The first step, as represented by block 510 and similar to step 210 discussed above, is to access a profile of an end user. The profile may include a characteristic associated with the end user. The system may then extract end user information form a database of an entity server. The next step, as represented by block 520 and similar to step 220 discussed above, is to identify a first trend related to resource utilization and/or management implemented by the end user based on the extracted end user information.

The next step, as represented by block 530, is to determine an opportunity based on the identified first trend. This opportunity may be determined by comparing the characteristic of the end user with a predetermined characteristic level and/or a standardized characteristic level that may be an average, median or other metric of a group of characteristic levels associated with a group of other users. The group of other users may be correlated to the end user, such as a group of users who share one or more common characteristics, or they may be uncorrelated to the end user, but rather, represent a larger set or the entire population.

The next step, as represented by block 540, is to display a recommendation based on the opportunity and to receive an input regarding the recommendation. In some embodiments, the system does not necessarily present a recommendation to the user but rather tracks the features that are presented to the user and the selections or non-selections of the features by the user, and in some embodiments, the system both provides recommendations and tracks their selection or non-selection as well as tracking the end user's selection or non-selection of features presented to the user.

This information may provide the system inputs for an artificial intelligence engine that determines a recommendation and/or feature profile of the end user. This recommendation and/or feature profile indicates which recommendations, which types of recommendations (e.g., light-hearted, humorous, serious, logical, etc.), the end user responds to, and which features the end user responses to (and thereby determines to which recommendations/features the end user prefers).

The next step, as represented by block 550, is to determine that the end user correlates to a modified interface experience. This may be done by comparing the user's response or lack of response to one or more features and/or one or more recommendations. Once data is collected regarding the user's preferences for features and/or recommendations, the engine may then correlate the end user with a recommendation/feature profile. Such a profile may indicate one or more preferences (e.g., tone of recommendations, layout of interface, frequency with which features/recommendations are presented, duration of features/recommendation, etc.) for implementing the user experience. Thus, as represented by block 560, the last step is to change the graphical user interface of the end user device from a standard profile to the modified profile, which better matches the end user's preferences for features and/or recommendations.

In various embodiments, the AI engine continues to learn from the interface's interactions with the end user after the interface has been modified. The AI engine may track which pages the end user prefers, how long he or she views particular pages. The subject matter, layout, duration, etc. of the pages may be used to determine a user preference for a particular characteristic of pages or features. Once the characteristic is known, then the interface may be modified to closer match the end user's preferences.

In various embodiments, the AI engine may recognize a tone of speech used by the user in interacting the interface. For example, if the user is interacting with the interface by typing a message, the system may identify the user is using a particular conversational style. The system may then replicate the conversational style of the user in responding to the user's messages or in presenting recommendations or suggestions to the user.

In some embodiments, as discussed above, the tone of the recommendations or suggestions being presented to the user may be determined by the AI engine. This tone may be a humorous tone, a logical tone, or otherwise. The system may determine the user prefers a particular tone by recognizing that the user responds positively to messages written in a particular tone. Alternatively, the system may determine that the user prefers a particular tone by presenting multiple messages (each having a different tone) to the user and asking the user to select which message the user prefers.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein. For example, a portion of one or more applications may be stored on the user device, or may be included as a portion of financial institution applications, such as an online entity application, in order to achieve embodiments of the inventions described herein.

It should be understood, that the systems and devices described in FIG. 1, or other devices not specifically described herein, may be configured to establish a communication link with each other in order to accomplish the steps of the processes described herein. The link may be an internal link within the same entity (e.g., within the same financial institution or device provider) or a link with the other systems of entities (e.g., social networking systems, third-party systems, or the like). In some embodiments, the systems may be configured for monitoring the applications and devices that the system(s) utilize as data sources. The information received from monitoring may be provided via wireless network path portions through the Internet. When the systems or devices are not monitoring a source or are not being monitoring, the information need not be transmitted from the source through the Internet to the destination, although it could be. The sources of information may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format. In response to continuously monitoring the real-time data ds from the various systems or devices, the system may be configured to provide target information to the user and/or allow the user to make changes to or control the applications and/or devices.

Moreover, it should be understood that the process flows described herein include transforming the information sent and/or received from the applications of the different systems (e.g., internally or externally) and/or the devices from one or more data formats into a data format associated with an application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 7428US1.014033.2891 | 15/288,797 published as U.S. Patent Publication No. 2018/0101900 | REAL-TIME DYNAMIC GRAPHICAL REPRESENTATION OF RESOURCE UTILIZATION AND MANAGEMENT | Oct. 7, 2016 |
| 7428US2.014033.2892 | 15/288,819 published as U.S. Patent Publication No. 2018/0101568 | SYSTEM FOR TRANSMISSION AND USE OF AGGREGATED METRICS INDICATIVE OF FUTURE CUSTOMER CIRCUMSTANCES | Oct. 7, 2016 |
| 7430US1.014033.2894 | 15/288,805 published as | SYSTEM FOR GENERATING USER EXPERIENCE FOR IMPROVING | Oct. 7, 2016 |

-continued

| Docket Number | U.S. patent application Ser. No. | Title | Filed On |
|---|---|---|---|
| | U.S. Patent Publication No. 2018/0101901 | EFFICIENCIES IN COMPUTING NETWORK FUNCTIONALITY BY SPECIALIZING AND MINIMIZING ICON AND ALERT USAGE | |
| 7431US1.014033.2901 | 15/288,826 published as U.S. Patent Publication No. 2018/0103086 | SYSTEM FOR AUTOMATICALLY ESTABLISHING OPERATIVE COMMUNICATION CHANNEL WITH THIRD PARTY COMPUTING SYSTEMS FOR SUBSCRIPTION REGULATION | Oct. 7, 2016 |
| 7431US2.014033.2902 | 15/288,833 published as U.S. Patent Publication No. 2018/0103112 | SYSTEM FOR AUTOMATICALLY ESTABLISHING AN OPERATIVE COMMUNICATION CHANNEL TO TRANSMIT INSTRUCTIONS FOR CANCELING DUPLICATE INTERACTIONS WITH THIRD PARTY SYSTEMS | Oct. 7, 2016 |

What is claimed is:

1. A system for generating customer-specific user experiences based on real-time analysis of customer responses to recommendations, the system comprising:
   a network communication interface;
   a memory device storing a resource utilization and management application;
   a processing device operatively coupled to the memory device, wherein the processing device is configured to execute computer-readable program code to:
   access a profile of an end user comprising at least one first characteristic associated with the end user and extract end user information from a database of an entity server;
   identify a first trend related to resource utilization and/or management implemented by the end user based on the extracted end user information;
   determine an opportunity based on the identified first trend;
   in response to determining the opportunity, transmit, to the end user, control signals configured to cause a graphical user interface of the device of the end user to display graphically at least one recommendation based on the determined opportunity;
   transmit control signals configured to cause the graphical user interface of the device of the end user to receive an input selecting at least one recommendation, thereby indicating a positive response to the at least one recommendation, or declining all the recommendations, thereby indicating a negative response to all the recommendations;
   receive, via the graphical user interface, an input selecting at least one recommendation, thereby indicating a positive response to the at least one recommendation, or declining all the recommendations, thereby indicating a negative response to all the recommendations;
   based on at least one of (i) one or more negative responses and (ii) one or more positive responses, determine that the end user correlates to a modified graphical user interface; and
   transmit control signals configured to cause the graphical user interface of the device of the end user to change from a standard interface profile to a modified interface profile, wherein the modified interface profile modifies at least one of a tone for presenting the at least one recommendation, a layout of the graphical user interface, a frequency with which the at least one recommendation is presented, a duration for presenting the at least one recommendation.

2. The system of claim 1, wherein the processing device is further configured to execute computer-readable program code to:
   continuously monitor the end user information for any changes; and
   transmit control signals configured to cause the graphical user interface of the device of the end user to display an updated opportunity.

3. The system of claim 1, wherein the first characteristic includes at least one of time period of existence range, zip code, salary range, location, occupation type, number of children, and goals.

4. The system of claim 1, wherein the processing device is further configured to execute computer-readable program code to: send an alert to the end user notifying the end user of the change to the modified interface profile.

5. A system for generating customer-specific user experiences based on real-time analysis of customer responses to recommendations, the system comprising:
   a network communication interface;
   a memory device storing a resource utilization and management application;
   a processing device operatively coupled to the memory device, wherein the processing device is configured to execute computer-readable program code to:
   initiate presentation of a graphical user interface to an end user;
   transmit control signals configured to cause the graphical user interface of the device of the end user to display graphically at least one feature;
   transmit control signals configured to cause the graphical user interface of the device of the end user to receive an input selecting at least one feature, thereby indicating a positive response to the at least one feature, or declining all the feature, thereby indicating a negative response to all the features;
   receive, via the graphical user interface, an input selecting at least one feature, thereby indicating a positive response to the at least one feature, or declining all the features, thereby indicating a negative response to all the features;

based on at least one of (i) one or more negative responses and (ii) one or more positive responses, determine that the end user correlates to a modified graphical user interface by performing a database lookup to determine which of a plurality of feature profiles the end user matches, based on the one or more negative responses and/or positive responses; and transmit control signals configured to cause the graphical user interface of the device of the end user to change from a standard interface profile to a modified interface profile, wherein the modified interface profile modifies at least one of a tone for presenting that at least one feature, a layout of the graphical user interface, a frequency with which the at least one feature is presented, a duration for presenting the at least one feature.

* * * * *